US009440731B2

United States Patent
Coulmeau et al.

(10) Patent No.: US 9,440,731 B2
(45) Date of Patent: Sep. 13, 2016

(54) METHOD FOR AIDING NAVIGATION MAKING IT POSSIBLE TO MANAGE A VERTICAL CONSTRAINT IN AN ANTICIPATED MANNER

(71) Applicant: THALES, Neuilly-sur-Seine (FR)

(72) Inventors: Francois Coulmeau, Seilh (FR); Xavier Blanchon, Toulouse (FR); Christophe Pierre, Valence (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 13/934,854

(22) Filed: Jul. 3, 2013

(65) Prior Publication Data

US 2014/0012436 A1    Jan. 9, 2014

(30) Foreign Application Priority Data

Jul. 5, 2012    (FR) ...................... 12 01898

(51) Int. Cl.
| G01C 23/00 | (2006.01) |
| G08G 5/00 | (2006.01) |
| B64C 19/00 | (2006.01) |
| G05D 1/10 | (2006.01) |
| G05D 1/06 | (2006.01) |

(52) U.S. Cl.
CPC ............. *B64C 19/00* (2013.01); *G05D 1/0607* (2013.01); *G05D 1/101* (2013.01)

(58) Field of Classification Search
CPC .................................................... G08G 5/003
See application file for complete search history.

(56) References Cited

U.S. PATENT DOCUMENTS

| 4,021,009 | A |  | 5/1977 | Baker et al. |
| 6,112,141 | A |  | 8/2000 | Briffe et al. |
| 7,219,011 | B1 |  | 5/2007 | Barber |
| 8,099,201 | B1 |  | 1/2012 | Barber et al. |
| 2005/0010359 | A1 | * | 1/2005 | Qureshi ........................ 701/205 |
| 2005/0143904 | A1 | * | 6/2005 | Haas ............................ 701/120 |

(Continued)

FOREIGN PATENT DOCUMENTS

| FR | 2916840 A1 | 12/2008 |
| FR | 2945622 A1 | 11/2010 |

*Primary Examiner* — Rami Khatib
*Assistant Examiner* — Navid Ziaeianmehdizadeh
(74) *Attorney, Agent, or Firm* — Baker & Hostetler LLP (57) ABSTRACT

A method for aiding navigation is provided, implemented in a flight management system, for the construction of a vertical trajectory of an aircraft following a predetermined lateral trajectory between a departure point and an arrival point; the departure point and arrival point furthermore being characterized by predefined altitudes, respectively $H_d$ and $H_a$, and predefined speeds, respectively $V_d$ and $V_a$. The method comprises the steps of: selection of a transition manoeuvre in terms of altitude and speed from a predetermined list of manoeuvres; determination of a manoeuvre point $P_M$ on the lateral trajectory, of altitude $H_d$ and of speed $V_d$, from which the transition manoeuvre must be initiated so as to allow the aircraft to reach at the arrival point the predefined speed $V_a$ and the predefined altitude $H_a$.

11 Claims, 10 Drawing Sheets

(56) References Cited

U.S. PATENT DOCUMENTS

| | | | |
|---|---|---|---|
| 2005/0283281 A1* | 12/2005 | Hartmann et al. | 701/4 |
| 2006/0273928 A1* | 12/2006 | Van Boven | 340/945 |
| 2007/0164877 A1 | 7/2007 | Mumaw et al. | |
| 2008/0300737 A1 | 12/2008 | Scale et al. | |
| 2010/0198433 A1* | 8/2010 | Fortier et al. | 701/14 |
| 2010/0200704 A1* | 8/2010 | Berens et al. | 244/76 A |
| 2010/0324812 A1 | 12/2010 | Sacle et al. | |
| 2011/0077859 A1* | 3/2011 | Coulmeau et al. | 701/204 |
| 2011/0137493 A1* | 6/2011 | Dacre-Wright et al. | 701/3 |
| 2012/0059535 A1* | 3/2012 | Jackson et al. | 701/3 |
| 2012/0253562 A1* | 10/2012 | Wachenheim et al. | 701/4 |

\* cited by examiner

METHOD FOR AIDING NAVIGATION MAKING IT POSSIBLE TO MANAGE A VERTICAL CONSTRAINT IN AN ANTICIPATED MANNER

CROSS-REFERENCE TO RELATED APPLICATION

This application claims priority to foreign French patent application No. FR 1201898, filed on Jul. 5, 2012, the disclosure of which is incorporated by reference in its entirety.

FIELD OF THE INVENTION

The invention relates to a method for aiding navigation for the construction of a vertical trajectory of an aircraft following a predetermined lateral trajectory between a departure point and an arrival point. More particularly it pertains to a method for determining a point of the lateral trajectory from which a change of altitude and of speed of the aircraft is initiated, making it possible to reach the arrival point at a predetermined altitude and a predetermined speed.

BACKGROUND

Systems for aiding navigation have experienced a significant upsurge in order to cope with the constant increase in air traffic and with the resulting growing work load for the pilot. To reconcile an ever shorter decision time and a general trend to reduce the number of crew members, numerous automated procedures have been developed, with the aim of freeing the crew from routine tasks, and in a general manner, of improving the in-flight performance of an aircraft.

Thus, the known systems for aiding navigation have means for computing trajectories between waypoints defined in a flight plan advised by the pilot. The trajectories, computed at the start of the flight and updated regularly in the course of the flight, are a support for the manoeuvres of the aircraft, which are decided by the pilot or by an automatic piloting system. In the known prior art, the computed trajectory is split between a lateral trajectory, typically a latitude and a longitude, and a vertical profile applied to this lateral trajectory to take into account constraints, for example regarding the relief or the management of fuel consumption.

These existing trajectory computation means turn out nevertheless to be insufficient for certain particular flight phases. Procedures for which a requirement in terms of both altitude and speed of the aircraft is associated with a waypoint have notably made their appearance. The known systems have no navigation aid for this type of procedure, the crew decides only the moment and the manoeuvres to be engaged to allow the aircraft to reach target altitude and speed at the requested waypoint. It is therefore desirable to have means for aiding navigation for these particular flight phases, notably to warn the crew and accompany them in their manoeuvres.

Figure 1:
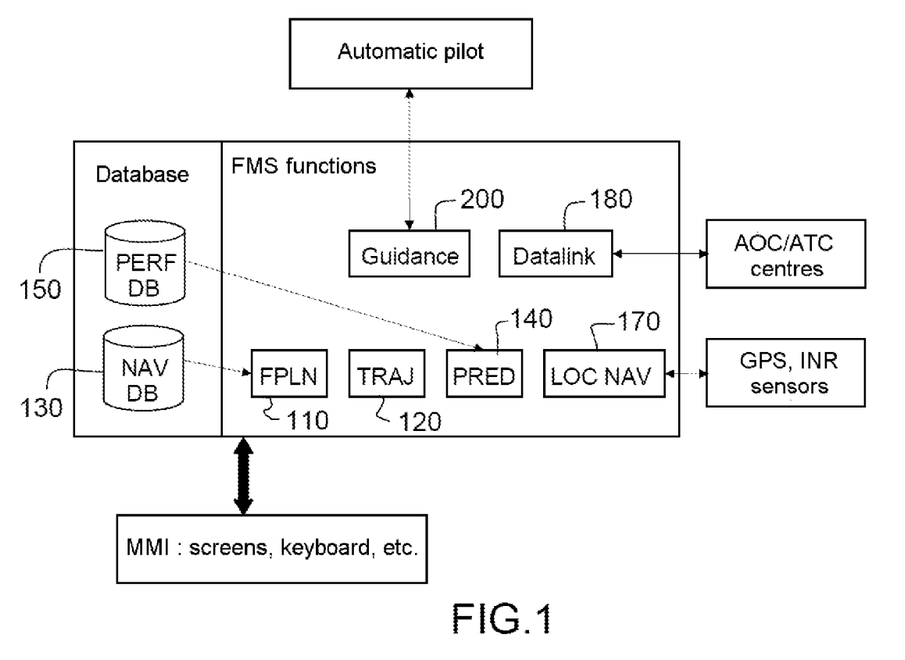
FIG. 1, already presented, represents a known system for aiding navigation, commonly called FMS.

Known among systems for aiding navigation are flight management systems, termed FMS, a functional architecture of which is shown diagrammatically in FIG. 1. In accordance with the ARINC standard 702, they ensure notably the functions of:

Navigation LOCNAV, 170, for performing optimal location of the aircraft as a function of the geo-location means (GPS, GALILEO, VHF radio beacons, inertial platforms, etc.), Flight plan FPLN, 110, for inputting the geographical elements constituting the skeleton of the route to be followed (departure and arrival procedures, waypoints, etc.), Navigation database NAVDB 130, for constructing geographical routes and procedures with the help of data included in the bases (points, beacons, interception or altitude legs, etc.), Performance database, PRF DB 150, containing the craft's aerodynamic and engine parameters, Lateral trajectory TRAJ, 120, for constructing a continuous trajectory on the basis of the points of the flight plan, complying with the performance of the aircraft and the confinement constraints, Predictions PRED, 140, for constructing an optimized vertical profile on the lateral trajectory, Guidance, GUID 200, for guiding in the lateral and vertical planes the aircraft on its 3D trajectory, while optimizing the speed, Digital data link DATALINK, 180, for communicating with the control centres and other aircraft.

On the basis of the flight plan FPLN defined by the pilot, consisting of a list of so-called waypoints, a lateral trajectory is determined as a function of the geometry between the waypoints and/or the altitude and speed conditions. On the basis of this lateral trajectory, a prediction function PRED defines an optimized vertical profile taking account of possible altitude, speed and time constraints, if any. Accordingly, the FMS system has performance tables PERFDB 150, which define the modeling of the aerodynamics and engines. The prediction function PRED 140 implements the equations of aircraft dynamics. These equations are based numerically on values contained in the performance tables for computing drag, lift, and thrust. By double integration, the speed vector and the position vector of the aeroplane are deduced therefrom. This predictive computation function is well known to the person skilled in the art and is not repeated in detail here, the method according to the invention uses this function for the construction of a vertical trajectory.

Figure 2:
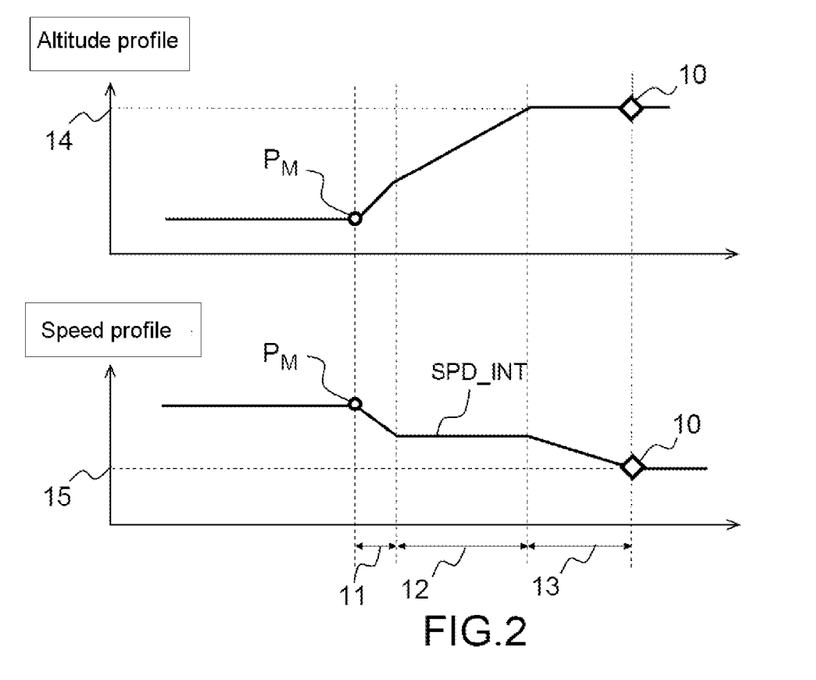
FIG. 2, already presented, illustrates the principle of a phase of transition, in terms of altitude and speed, of an aircraft.

FIG. 2 illustrates the principle of a transition manoeuvre in terms of altitude and speed of an aircraft. Starting from a flight phase carried out at an initial altitude and an initial speed, it is sought to reach a predetermined altitude $H_a$ and a predetermined speed $V_d$ through a transition manoeuvre. FIG. 2 illustrates the case of a manoeuvre making it possible to increase the altitude of the aircraft and to reduce its speed; the principle of the transition also applies to the other possible combinations, ascending or descent, to a higher or lower speed.

The upper graphic presents the evolution of the altitude profile and the lower graphic the evolution of the speed profile between a manoeuvre start point $P_M$ and an end point 10 of a transition manoeuvre. For reasons of simplicity, a rectilinear lateral trajectory is represented by the abscissa axis; the transition manoeuvre applies to a non-rectilinear trajectory according to the same principle.

The transition manoeuvre comprises three successive segments:

A first segment 11, commonly called OPEN1, in the course of which the altitude and the speed evolve according to two constant gradients; a substantially constant thrust being delivered by the aircraft's propulsion system. This segment is continued until a predetermined intermediate speed SPD_INT is reached.

A second segment 12, commonly called OPEN2, in the course of which the thrust and the orientation of the aircraft are adapted to ensure a constant speed and an evolution of the altitude according to a constant gradient. This segment is continued until the target altitude 14 of the transition end point 10 is reached.

A third segment 13, commonly called LVL, in the course of which the altitude is maintained constant, and the speed evolves according to a constant gradient until the target speed 15 of the transition end point 10 is reached.

This type of transition manoeuvre in terms of altitude and speed in three successive segments is a manoeuvre commonly implemented in the course of a flight. Other manoeuvres exist to allow a transition between an altitude and a speed of departure and arrival. For example, by defining an intermediate speed SPD_INT equal to the arrival speed, a two-segment transition manoeuvre is carried out. The method described by the present invention applies according to the same principle to these other transition manoeuvres.

Let us also note that the type of manoeuvre and its constraint parameters, such as for example the intermediate speed value SPD_INT, are input parameters of the previously described prediction function PRED. Typically, the function makes it possible to determine a vertical trajectory by defining a certain number of parameters such as a target altitude and speed, a type of manoeuvre and its constraint parameters.

Nevertheless, there does not exist any automated procedure making it possible to integrate altitude and speed requirements at a waypoint with the vertical trajectory computation. Stated otherwise, the crew alone must determine when to initiate the transition manoeuvre to allow the aircraft to reach target altitude and speed at the desired waypoint.

Such is the case notably when the crew receives instructions from the air traffic control containing a requirement in terms of altitude and/or speed. The following instructions notably, not implemented in a deployment norm but standardized forthwith, are considered to be among these air traffic control instructions:

CLIMB TO REACH [A] BY [B], (i.e. climb to an altitude [A] for a position [B]),
DESCEND TO REACH [A] BY [B], (i.e. descend to an altitude [A] for a position [B]),
REACH [A] BY [B], (i.e. reach an altitude [A] for a position [B]),
CROSS [A] AT [B], (i.e. cross the position [A] at the altitude [B]),
CROSS [A] AT OR ABOVE [B], (i.e. cross the position [A] at an altitude at least equal to [B]),
CROSS [A] AT OR BELOW [B], (i.e. cross the position [A] at an altitude at most equal to [B]),
CROSS [A] AT AND MAINTAIN [B], (i.e. cross the position [A] at the altitude [B] and maintain your altitude),
CROSS [A] BETWEEN [B1] AND [B2], (i.e. cross the position [A] between the altitude [B1] and the altitude [B2]).

SUMMARY OF THE INVENTION

The general idea of the present invention consists of a method for computing the start point of a manoeuvre of the aircraft making it possible to reach the target altitude and speed at a specified arrival point. This manoeuvre start point makes it possible to construct a possible vertical trajectory between a departure point and an arrival point. The method according to the invention is an iterative process, the convergence of which is ensured in a deterministic number of passes, so as to guarantee the response time of the function.

For this purpose, the subject of the invention is a method for aiding navigation, implemented in a flight management system, for the construction of a vertical trajectory of an aircraft following a predetermined lateral trajectory between a departure point and an arrival point; the said departure point and arrival point furthermore being characterized by predefined altitudes, respectively $H_d$ and $H_a$, and predefined speeds, respectively $V_d$ and $V_a$. The method comprises the steps of:

selection of a transition manoeuvre in terms of altitude and speed from a predetermined list of manoeuvres,
determination of a manoeuvre point $P_M$ on the lateral trajectory, of altitude $H_d$ and of speed $V_d$, from which the transition manoeuvre must be initiated so as to allow the aircraft to reach at the arrival point the predefined speed $V_a$ and the predefined altitude $H_a$.

Advantageously, the manoeuvre point $P_M$ is determined by an iterative process comprising an initialization step, consisting in positioning an initial manoeuvre point $P_{M0}$, on the lateral trajectory, between the departure point and the arrival point, and an iterative step consisting of:

a predictive computation of a vertical trajectory between the departure and arrival point, comprising a transition segment, between an intermediate manoeuvre point $P_{Mi}$ on the lateral trajectory and a point of attainment on the lateral trajectory, allowing the aircraft to attain the altitude $H_a$ and the speed $V_a$ through the transition manoeuvre; the intermediate manoeuvre point $P_{Mi}$ being defined in a first iterative loop as the initial manoeuvre point $P_{M0}$; the intermediate manoeuvre point $P_{Mi}$ being defined in a first iterative loop as the initial manoeuvre point $P_{M0}$, a computation of a new intermediate manoeuvre point $P_{Mi+1}$, y shifting the manoeuvre point $P_{Mi}$ on the lateral trajectory by a distance $D_i$ separating the point of attainment from the arrival point along the lateral trajectory;

the said iterative process being interrupted when the distance $D_i$ is less than a predetermined threshold; the manoeuvre point $P_M$ being defined as the intermediate manoeuvre point $P_{Mi}$ at the moment of interruption of the iterative process.

Advantageously, the initial manoeuvre point $P_{M0}$ is determined on the basis of the arrival point by means of a segment of constant slope of predetermined angle.

Advantageously, a transition manoeuvre comprises three successive segments:

a first segment, in the course of which the altitude and the speed of the aircraft evolve according to two constant gradients, until a target intermediate speed is reached,
a second segment, in the course of which the speed of the aircraft is maintained constant and the altitude evolves according to a constant gradient, until a target altitude,
a third segment, in the course of which the altitude of the aircraft is maintained constant, and the speed evolves according to a constant gradient, until a target speed.

Advantageously, the initial manoeuvre point $P_{M0}$ is determined on the basis of the arrival point by means of an estimation of lateral length of each of the segments of the transition manoeuvre, by assigning predetermined values to the gradients of speed and of altitude of each of the segments.

Advantageously, the initial manoeuvre point $P_{M0}$ is determined for a mass of the aircraft computed by a Breguet formula, at a dummy point defined by an altitude identical to the departure point and lateral coordinates identical to the arrival point.

Advantageously, the initial manoeuvre point $P_{M0}$ is determined for a mass of the aircraft computed by a Breguet formula, at a dummy point defined by an altitude identical to the departure point and lateral coordinates computed by means of a segment of constant slope of predetermined angle joining the dummy point to the arrival point along the lateral trajectory.

Advantageously, the initial manoeuvre point $P_{M0}$ is determined on the basis of the arrival point by a predictive trajectory computation, carried out backwards and allowing the aircraft to attain the altitude $H_d$ and the speed $V_d$ through the transition manoeuvre.

Advantageously, the initialization step furthermore comprises a computation of an anticipated initial point $P_{A0}$ on the lateral trajectory, positioned between the departure point and the initial manoeuvre point $P_{M0}$, and a predictive computation of trajectory between the departure point and the anticipated initial point $P_{A0}$, making it possible to limit the predictive trajectory computation of the iterative step to the segment joining the anticipated initial point $P_{A0}$ and the arrival point.

Advantageously, the anticipated initial point $P_{A0}$ is determined by means of the following formula:

$$D_{A0}=K \times D_{M0},$$

in which $D_{A0}$ is a distance separating the anticipated initial point $P_{A0}$ from the initial manoeuvre point $P_{M0}$, $D_{M0}$ is a distance separating the initial manoeuvre point $P_{M0}$ from the arrival point, and K is a predetermined coefficient.

Advantageously, the coefficient K is determined by means of the following formula:

$$K=WIND_{MAX}/TAS_{MIN},$$

in which $WIND_{MAX}$ is an estimation of maximum wind speed between the initial manoeuvre point $P_{M0}$ and the arrival point, and $TAS_{MIN}$ is an estimation of minimum speed of the aircraft between the initial manoeuvre point $P_{M0}$ and the arrival point.

Advantageously, the method comprises a step of computing a position correction of the manoeuvre point $P_M$, at least as a function of the altitude of the departure and arrival point, of a distance separating the manoeuvre point $P_M$ and the arrival point along the vertical trajectory, and of a speed of the aircraft at the manoeuvre point $P_M$; the said correction being determined so as to make it possible to take into account a constraint regarding time of transit at the arrival point.

The invention also pertains to a flight management system comprising code instructions making it possible to perform the computation steps of the method for aiding navigation having the characteristics described above.

BRIEF DESCRIPTION OF THE DRAWINGS

The invention will be better understood and other advantages will become apparent on reading the detailed description of the modes of implementation given by way of example in the following figures.

For the sake of clarity, the same elements will bear the same reference tags in the various figures. As mentioned in the case of FIG. 2, the trajectory of the aircraft is represented in the figures in a more easily representable simplified case where the lateral trajectory is rectilinear. Thus the rectilinear lateral trajectory is represented on the abscissa axis, the vertical profile is represented on the ordinate axis. Of course, the method according to the invention applies in an identical manner to a non-rectilinear lateral trajectory. A point of the lateral trajectory is therefore characterized by two coordinates, generally a latitude and a longitude. Likewise, one speaks of distance separating two points along the lateral trajectory in order to recall that this distance is not the length of a rectilinear segment joining the two points but the distance traversed by an aircraft following the lateral trajectory between the two points.

DETAILED DESCRIPTION

FIGS. 3a, 3b, 3c, 3d, 3e, 3f, 3g, 3h, 3i and 3j describe the principle of the method for constructing a vertical trajectory according to a first variant of the invention.

Figure 3A:
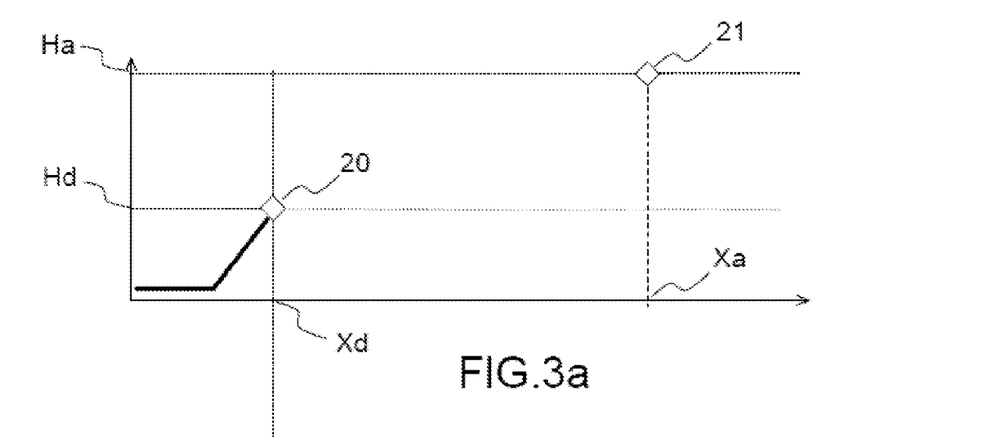
FIGS. 3a, 3b, 3c, 3d, 3e, 3f, 3g, 3h, 3i and 3j describe the principle of the method for constructing a vertical trajectory according to a first variant of the invention.

An aircraft following a predetermined lateral trajectory between two waypoints, a departure point 20 and an arrival point 21, is considered. The departure point 20 is characterized by coordinates $X_d$ on the lateral trajectory, typically a latitude and a longitude, by a predetermined altitude $H_d$, and by a predetermined speed $V_d$. Likewise, the arrival point 21 is characterized by coordinates $X_a$ on the lateral trajectory, by a predetermined altitude $H_a$ and by a predetermined speed $V_a$.

It is sought to construct a vertical trajectory between the departure point and the arrival point comprising a first segment carried out at constant altitude and speed, and a second transition segment making it possible to reach the arrival point at the altitude $H_a$ and the speed $V_a$ by means of the selected transition manoeuvre.

Figure 3B:
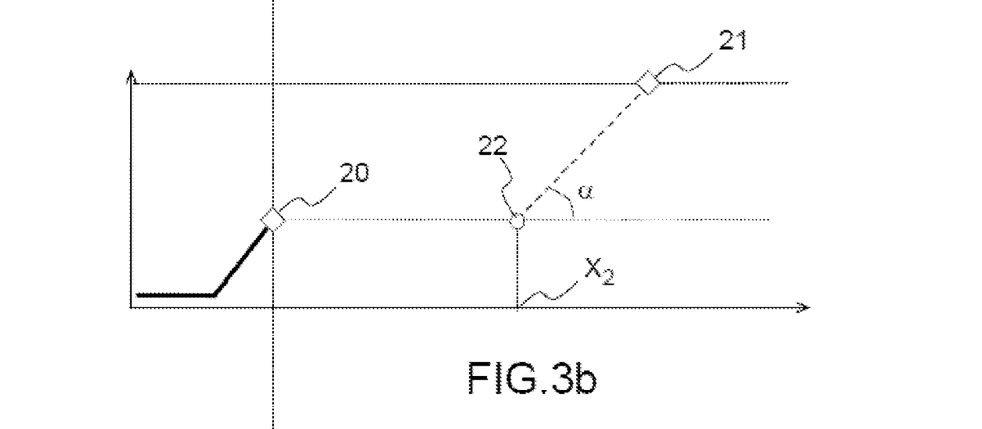

In a first variant of the invention, the method comprises a first step of estimating the mass of the aircraft at the moment of the transition manoeuvre. As illustrated in FIG. 3b, the method firstly determines coordinates $X_2$ of a dummy point 22 on the lateral trajectory, defined as the point of the lateral trajectory making it possible to attain the arrival altitude $H_a$ at the arrival point 21 by means of a segment of constant slope of predetermined angle. Thus, the coordinates $X_2$ can be computed through the following relation:

$$X_2 = X_a - (H_a - H_d)/\tan \alpha$$

in which $X_a$ and $X_2$ are the coordinates on the lateral trajectory of the points 21 and 22, $H_a$ and $H_d$ are the altitude of the arrival point 21 and departure point 20, and $\alpha$ is an angle of predetermined slope. For example, a mean slope of 3° may be chosen.

On the basis of the coordinates $X_2$, a mass $M_2$ of the aircraft is determined by means of a formula termed the Breguet formula. This formula is well known to the person skilled in the art and is not repeated here in detail. For the understanding of the present invention, the following simplified Breguet formula makes it possible to determine the mass $M_2$:

$$M_2 = M_d \times \exp(-(X_2 - X_d) \times WFE/(M_d \times TAS_d))$$

in which $M_2$ and $M_d$ are aircraft masses at the points 22 and 20, $X_2$ and $X_d$ are the coordinates on the lateral trajectory of the points 22 and 20, WFE (or Engine Fuel Flow in English) represents a mean fuel consumption at the point 22, and $TAS_d$ (True Air Speed) represents a speed of the aircraft in the air mass at the point 20.

Figure 3C:
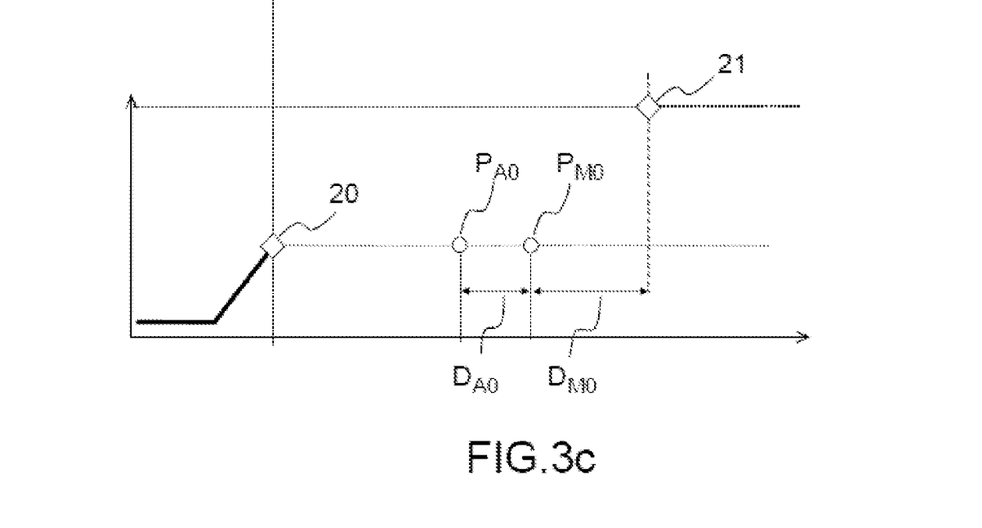

On the basis of the mass $M_2$ thus computed, the method determines two points on the lateral trajectory, as illustrated by FIG. 3c: an initial manoeuvre point $P_{M0}$ and an anticipated initial point $P_{A0}$. The distance separating the arrival point 21 from the initial manoeuvre point $P_{M0}$ along the lateral trajectory is denoted $D_{M0}$; and $D_{A0}$ denotes the distance separating the initial manoeuvre point $P_{M0}$ from the anticipated initial point $P_{A0}$ along the lateral trajectory.

The initial manoeuvre point $P_{M0}$ is determined on the basis of the previously computed mass $M_2$ and by means of simple formulae which do not take into account the conditions outside the aircraft. Thus, FIGS. 3d and 3e illustrate two possible modes of implementation for computing the coordinates of the point $P_{M0}$ on the lateral trajectory.

Figure 3D:
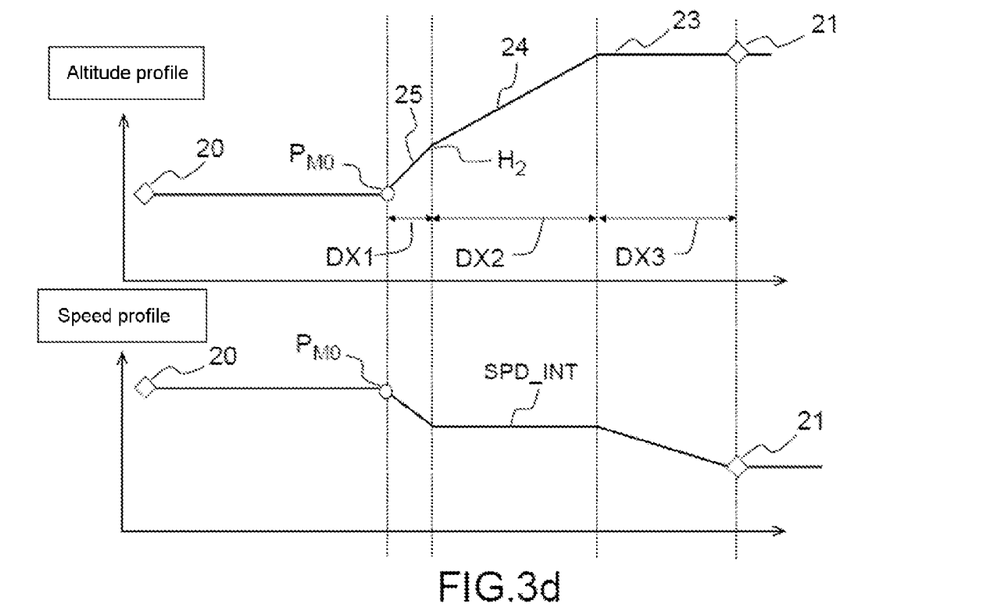
Figure 3E:
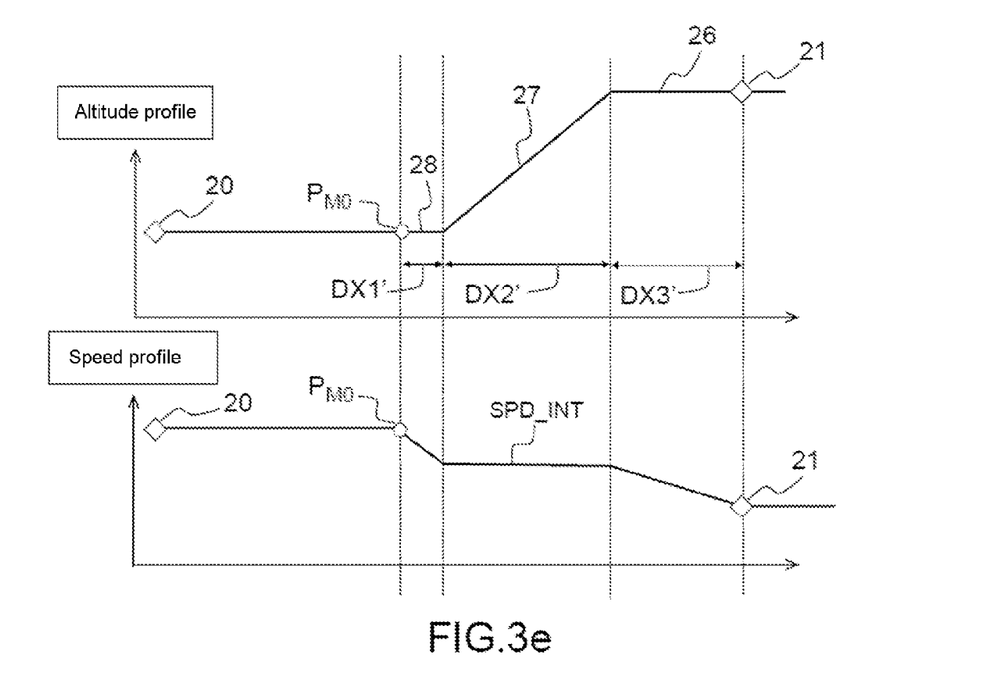

In a first mode of implementation represented by FIG. 3d, the distance $D_{M0}$ is computed as the sum of the lateral lengths of three segments 23, 24 and 25, constituting the segment of transition to the arrival point 21. The principle consists in determining the point $P_{M0}$ on the basis of the arrival point, based on the segments of the chosen transition manoeuvre, for example such as is described in FIG. 2. Thus, starting from the arrival point 21, the method successively determines:

- a segment 23 of length $DX_3$, making it possible to reduce, at constant altitude, the aircraft speed from the value $V_a$ of the arrival point 21 to a predetermined intermediate speed SPD_INT; the gradient of speed evolution being a calibratable computation parameter.
- a segment 24 of length $DX_2$, making it possible to reduce, at constant speed, the altitude of the aircraft from the value $H_a$ of the arrival point 21 to an intermediate altitude $H_2$;
- a segment 25 of length $DX_1$, making it possible to reduce the altitude from the value $H_2$ to the value $H_d$ of the departure point 20, and to reduce the speed from the value SPD_INT to the value $V_d$ of the departure point; the gradient of speed evolution being an adjustable computation parameter;

the distance $D_{M0}$ being determined by the sum of the lengths $DX_1$, $DX_2$ and $DX_3$.

In this first mode of implementation, an iterative process makes it possible to define the intermediate altitude $H_2$ while complying with the predetermined speed gradients of the segments 23, 24 and 25. In this process, the segment 25 is determined first, then we determine a segment 24 of set length which gives us an altitude $H_{2ini}$, and then we determine the segment 23. As a function of the mismatch in position and altitude between the end of the segment 23 and the position $X_d$ and altitude $H_d$, the length of the segment 24 is corrected until the segment 23 converges onto the values of position $X_d$ and of altitude $H_d$.

A second mode of implementation makes it possible to dispense with this iterative step for the computation of the initial manoeuvre point $P_{M0}$ on the basis of the arrival point.

As represented in FIG. 3e, the method determines the distance $D_{M0}$, on the basis of the arrival point 21, by means of the following three segments:

- a segment 26 of length $DX_3'$, making it possible to reduce, at constant altitude, the aircraft speed from the value $V_a$ of the arrival point 21 to a predetermined intermediate speed SPD_INT; the gradient of speed evolution being a calibratable computation parameter;
- a segment 27 of length $DX_2'$, making it possible to reduce, at constant speed, the aircraft altitude from the value $H_a$ of the arrival point 21 to the altitude $H_d$ of the departure point 20; the gradient of evolution of the altitude being a calibratable computation parameter;
- a segment 28 of length $DK_2'$, making it possible to reduce the speed from the value SPD_INT to the value $V_d$ of the departure point; the gradient of speed evolution being a calibratable computation parameter; the distance $D_{M0}$ being determined by the sum of the lengths $DX_1'$, $DX_2'$ and $DX_3'$.

This second mode of implementation makes it possible advantageously to do without an iterative loop, required for the computation of the intermediate altitude $H_2$ in the first mode of implementation.

The two previous modes of implementation have in common the computation of the initial manoeuvre point $P_{M0}$ on the basis of the arrival point by means of an estimation of lateral length of each of the segments of the transition manoeuvre, by assigning predetermined values to the gradients of speed and of altitude of each of the segments.

Moreover, the initial manoeuvre point $P_{M0}$ is advantageously determined for a mass of the aircraft computed by a Breguet formula, at a dummy point 22 defined by an altitude identical to the departure point and lateral coordinates computed by means of a segment of constant slope of predetermined angle joining the dummy point to the arrival point along the lateral trajectory.

For these two modes of implementation, the distance $D_{A0}$ separating the anticipated initial point $P_{A0}$ from the initial manoeuvre point $P_{M0}$ along the lateral trajectory is thereafter determined through the following formula:

$$D_{A0} = K \times D_{M0}$$

in which $D_{A0}$ is the distance separating the anticipated initial point $P_{A0}$ from the initial manoeuvre point $P_{M0}$, $D_{M0}$ is the distance separating the initial manoeuvre point $P_{M0}$ from the arrival point, and K is a predetermined coefficient.

Advantageously, the coefficient K takes account of the exterior conditions and in particular of the maximum wind speed. It is for example determined by means of the following formula:

$$K = WIND_{MAX}/TAS_{MIN}$$

in which $WIND_{MAX}$ is an estimation of the maximum speed of the wind between the initial manoeuvre point $P_{M0}$ and the arrival point 21, and $TAS_{MIN}$ is an estimation of the minimum speed of the aircraft between the initial manoeuvre point $P_{M0}$ and the arrival point 21.

Figure 3F:
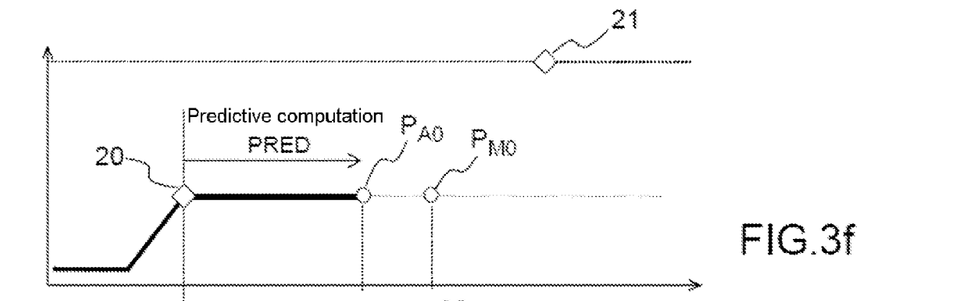

On the basis of this computation of the initial manoeuvre point $P_{M0}$ and of the anticipated initial point $P_{A0}$, the method determines, as represented in FIG. 3f, a vertical trajectory joining the departure point 20 to the anticipated initial point $P_{A0}$ by means of a predictive computation with a constant altitude equal to $H_d$ as constraint. Stated otherwise, the method advantageously comprises a step of computing an anticipated initial point $P_{A0}$ and a predictive computation of trajectory between the departure point 20 and the anticipated initial point $P_{A0}$, making it possible to limit the predictive trajectory computation of the iterative step to the segment joining the anticipated initial point $P_{A0}$ and the arrival point 21.

Figure 3G:
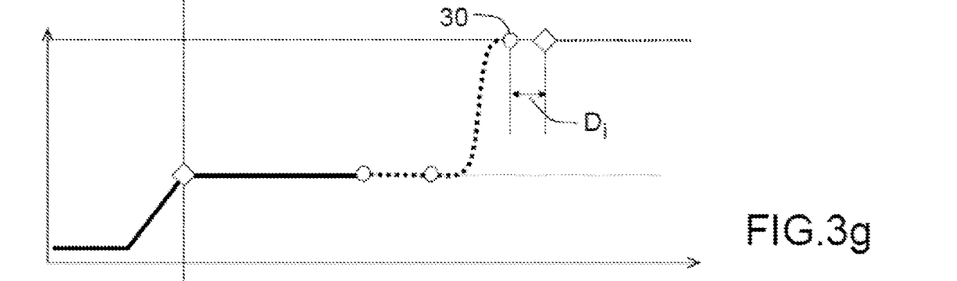
Figure 3H:
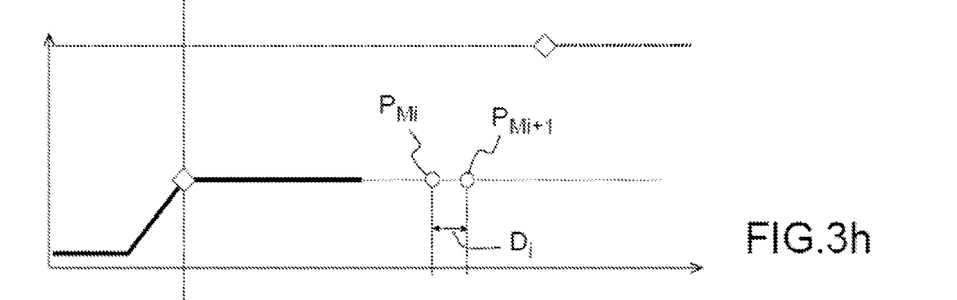
Figure 3I:
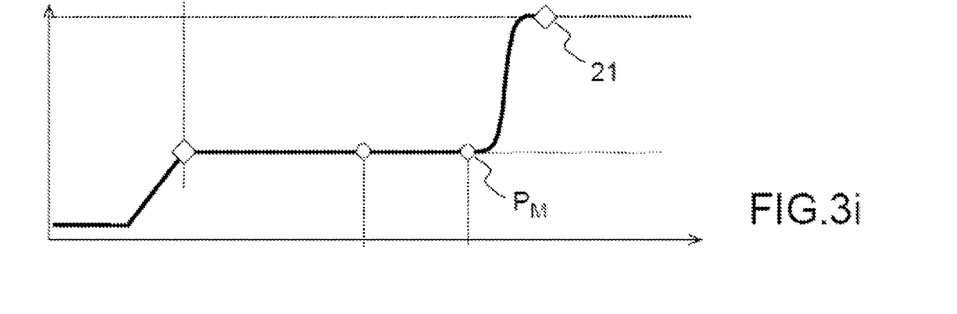

FIGS. 3g, 3h and 3i describe the iterative process making it possible to determine the manoeuvre point $P_M$ on the basis of the initial manoeuvre point $P_{M0}$. By convention, the manoeuvre point $P_M$ computed in the course of an iteration is denoted $P_{Mi}$, the manoeuvre point computed in the following iteration is denoted $P_{Mi+1}$.

In a first step of the iterative process described by FIG. 3g, a vertical trajectory is determined by means of a predictive computation, with as constraint a constant altitude equal to $H_d$ between the anticipated initial point $P_{A0}$ and the manoeuvre point $P_{Mi}$, and as constraint the requirement to attain the altitude $H_a$ and the speed $V_a$ starting from the manoeuvre point $P_{Mi}$ by means of the selected transition manoeuvre. In this variant, the predictive computation determines a vertical trajectory consisting of the three segments 11, 12 and 13 and which finishes at the altitude $H_a$ at a point of attainment 30. The distance separating the point of attainment 30 from the arrival point 21 is referenced $D_i$. This distance can be positive or negative depending on whether the computed point of attainment 30 is situated before or after the arrival point along the lateral trajectory.

In a second step, described by FIG. 3h, of the iterative process, the lateral coordinates of a manoeuvre point $P_{Mi+1}$ are determined on the basis of the lateral coordinates of the manoeuvre point $P_{Mi}$ by adding the distance $D_i$ along the lateral trajectory.

The iterative process continues by repeating a predictive computation with $P_{Mi+1}$ as start point of the transition manoeuvre. The iterative process is interrupted when the distance $D_i$ is less than a predetermined threshold. The vertical trajectory thus obtained, represented in FIG. 3i, satisfies the double constraint of maintaining a longest possible first trajectory portion carried out at constant altitude and constant speed, and of guaranteeing that the target altitude and speed are reached at the arrival point 21 by means of a predetermined transition manoeuvre; the said manoeuvre being able to be subject to diverse calibratable constraints such as an intermediate speed. The choice of the type of transition manoeuvre and of its constraints makes it possible to adapt the trajectory computation to demands, internal to the aircraft (manoeuvrability of the craft) or from outside (requests from the air traffic control, meteorological constraints, etc.).

Figure 3J:
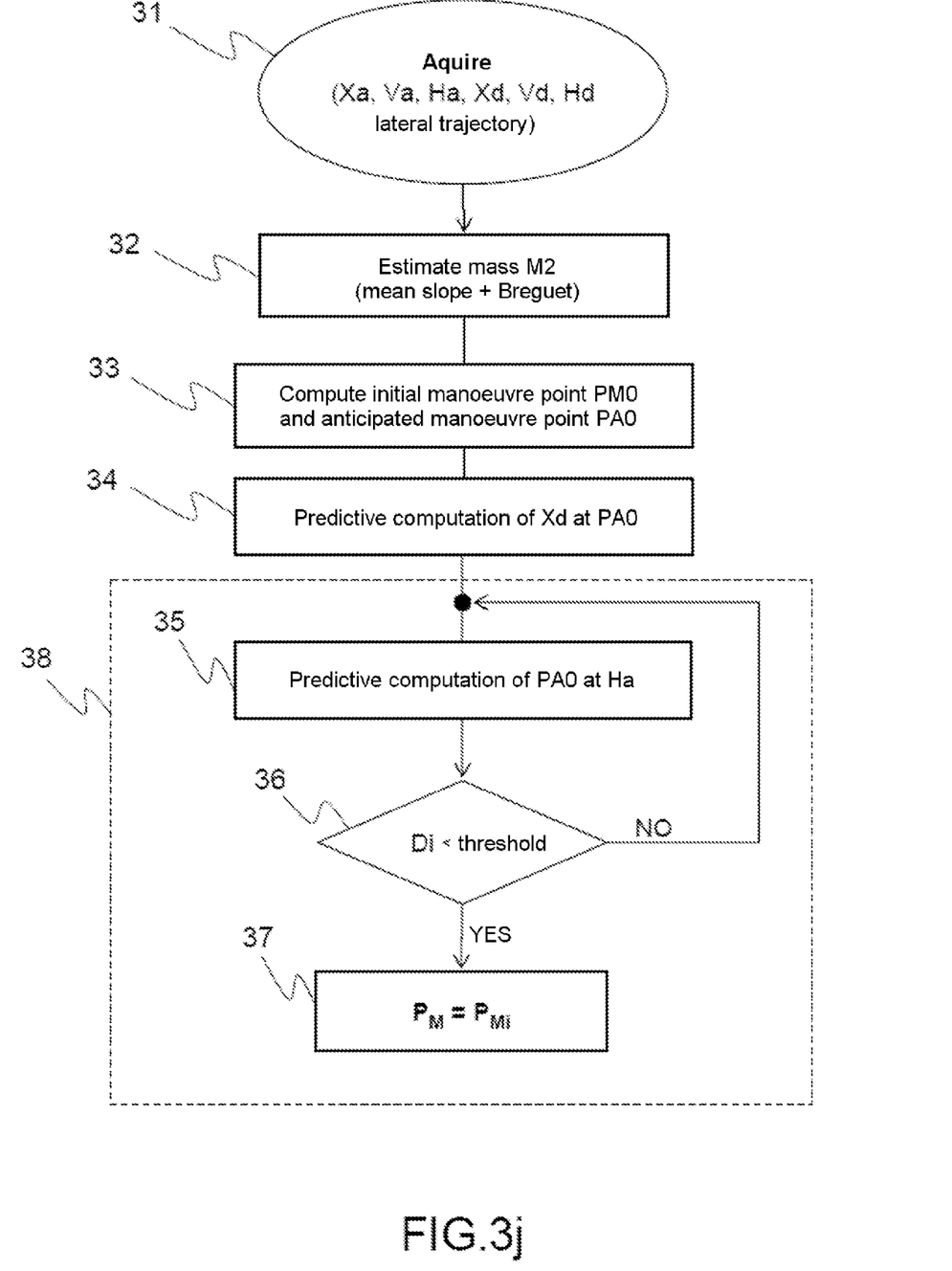

The main steps of the method according to the first variant of the invention are gathered together in the flowchart of FIG. 3j. In this first variant, the method comprises an acquisition step 31, making it possible to ensure that the information required for the computation is available (values characteristic of the departure and arrival points, lateral trajectory between these two points, choice of the transition manoeuvre and quantization of its constraints, etc.). A step 32 estimates the mass at a point 22 as described in FIG. 3b. A step 33 consists in computing an initial manoeuvre point $P_{M0}$ and an anticipated initial point $P_{A0}$ as represented in FIGS. 3c, 3d and 3e; two modes of implementation of the computation of the initial manoeuvre point $P_{M0}$ being illustrated by FIGS. 3d and 3e. A step 34 determines by predictive computation a vertical trajectory from the departure point 20 to the anticipated initial point $P_{A0}$, as represented in FIG. 3f. On the basis of the initial manoeuvre point $P_{M0}$ and of the anticipated initial point $P_{A0}$, an iterative process 38 makes it possible to determine the manoeuvre point $P_M$. The iterative process 38 thus comprises a step 35 of predictive computation of a vertical trajectory between the anticipated initial point $P_{A0}$ and a point of attainment 30. As long as the distance $D_i$ separating the point of attainment 30 from the arrival point 21 remains greater than a predetermined threshold, the iterative process continues, the distance $D_i$ is added to the lateral coordinates of the point $P_{Mi}$ before relaunching a predictive trajectory computation. The iterative process stops when $D_i$ is below the threshold, the manoeuvre point $P_M$ and the vertical trajectory are determined.

Advantageously, the number of iterative loop is low and deterministic since the equations for the dynamics of an aircraft in the vertical plane, which are used during the integration, are locally convex and ensure convergence to the optimum in a deterministic number of steps. Numerically, for N subsonic transport aircraft, convergence is ensured in fewer than 2 iterations.

Figure 4A:
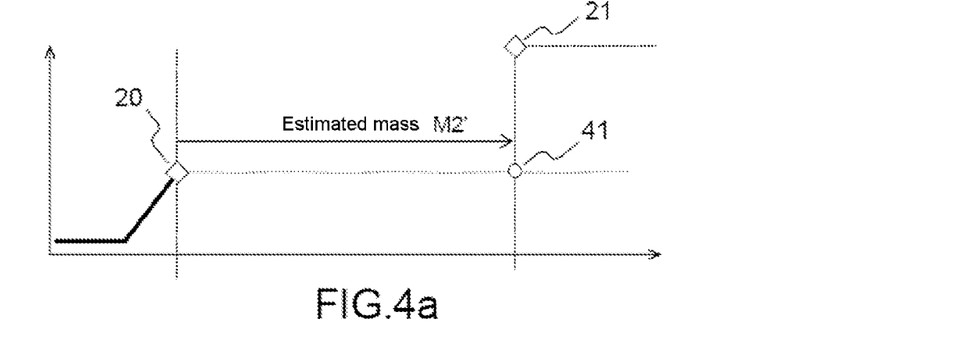
FIGS. 4a and 4b describe the principle of the method for constructing a vertical trajectory according to a second variant of the invention.
Figure 4B:
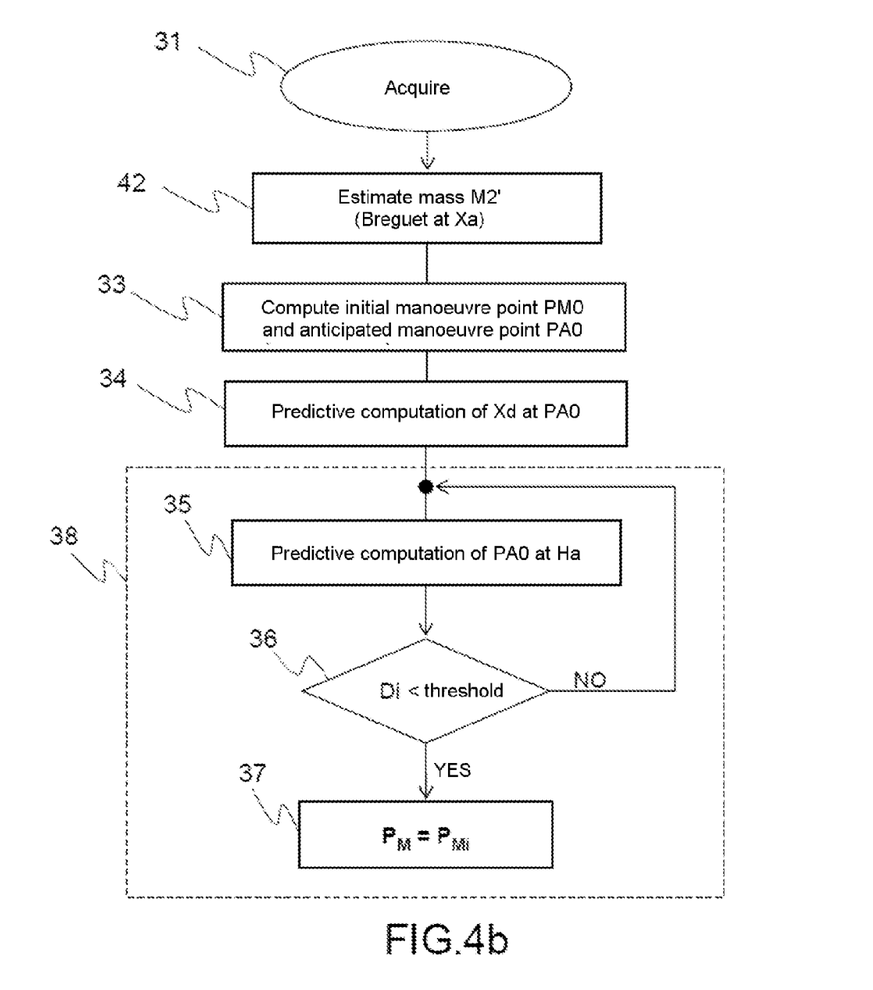

FIGS. 4a and 4b describe the principle of the method for constructing a vertical trajectory according to a second variant of the invention. This second variant simplifies the method according to the first variant through a simplified computation of the mass.

The principle of the estimation of the mass is illustrated in FIG. 4a. A mass $M_2'$ is determined at a dummy point 41 with lateral coordinates $X_a$ and with altitude $H_d$, assuming a path of the aircraft carried out at constant altitude equal to $H_d$ between the departure point and the point 41. In contradistinction to the first variant, the estimation of mass is not carried out at an intermediate point that is computed to approximate the manoeuvre start point. This step is eliminated so as to simplify the computation, the mass $M_2'$ is determined by means of a Breguet formula:

$$M_2' = M_d \times \exp(-(X_a - X_d) \times WFE/(M_d \times TAS_d))$$

in which $M_2'$ and $M_d$ are aircraft masses at the points 41 and 21, $X_a$ and $X_d$ are the coordinates on the lateral trajectory of the points 21 and 20, WFE represents a mean fuel consumption at the point 41, and $TAS_d$ represents a speed of the aircraft in the air mass at the point 20.

The other steps of the computation are identical to the first variant. The main steps of the method in this second variant are represented in the flowchart of FIG. 4b. The initialization of the iterative loop 38 contains steps 31, 33, 34 already described for the first variant, and a step 42 of simplified computation of the mass $M_2'$ such as detailed hereinabove. Steps 35, 36 and 37 of the iterative loop 38 are identical to the first variant.

In this variant, the initial manoeuvre point $P_{M0}$ is thus advantageously determined for a mass of the aircraft computed by a Breguet formula, at a dummy point defined by an altitude identical to the departure point and lateral coordinates identical to the arrival point. By simplifying the mass computation, the second variant of the method makes it possible to lighten the computational load and to free up memory for the computer which hosts the method for aiding navigation.

Figure 5A:
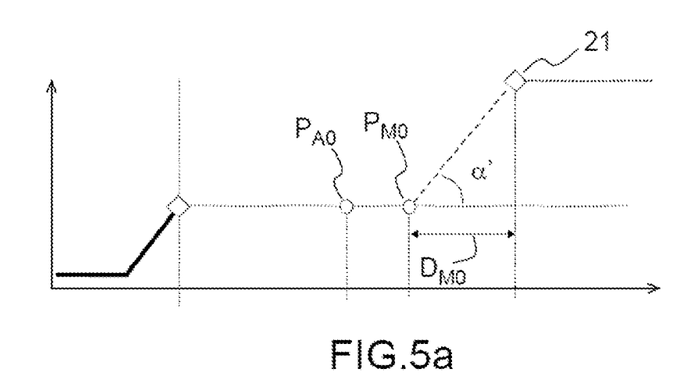
FIGS. 5a and 5b describe the principle of the method for constructing a vertical trajectory according to a third variant of the invention.
Figure 5B:
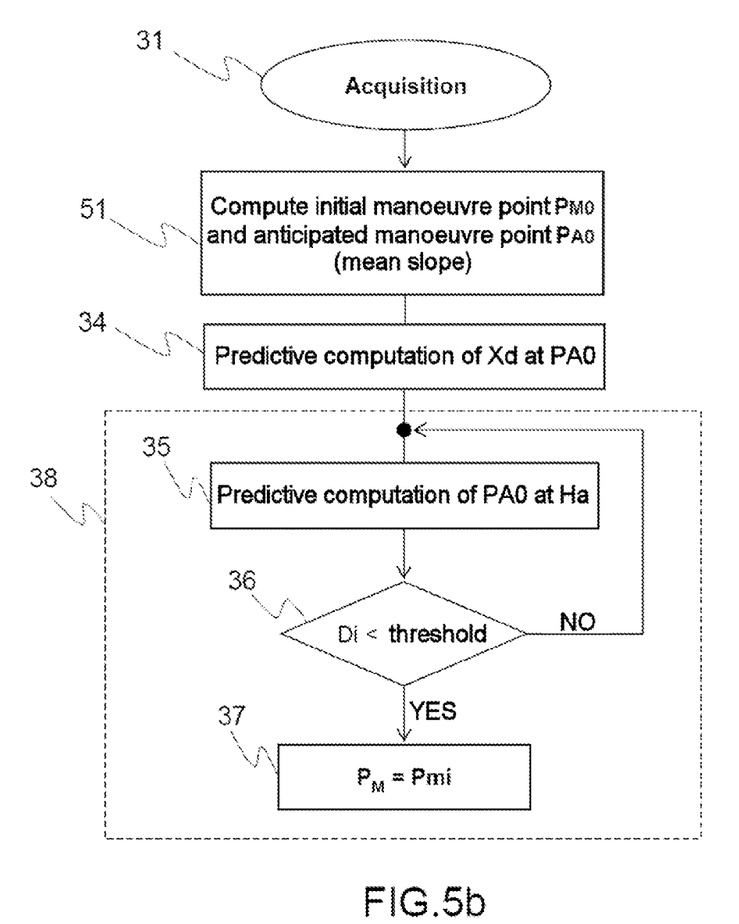

FIGS. 5a and 5b describe the principle of the method for constructing a vertical trajectory according to a third variant of the invention. This third variant further simplifies the method through a simplified computation of the initial manoeuvre point $P_{M0}$.

The principle of the computation of the initial manoeuvre point $P_{M0}$ is illustrated in FIG. 5a. The initial manoeuvre point $P_{M0}$ and distance $D_{M0}$ are determined on the basis of the arrival point 21 by assuming a transition carried out by means of a segment of constant slope of predetermined angle. Thus the distance $D_{M0}$ can be computed through the following relation:

$$D_{M0} = (H_a - H_d)/\tan \alpha'$$

in which $D_{M0}$ is the distance separating the initial manoeuvre point $P_{M0}$ and the arrival point 21 along the lateral trajectory, $H_a$ and $H_d$ are the altitude of the arrival point 21 and departure point 20, and $\alpha'$ is an angle of predetermined slope. For example, an angle $\alpha'$ of 3° may be chosen.

The computation of the initial manoeuvre point $P_{M0}$ is thus simplified; moreover, the estimation of mass is no longer required to determine $P_{M0}$, this step is eliminated from the method.

The distance $D_{A0}$ separating the anticipated initial point $P_{A0}$ from the initial manoeuvre point $P_{M0}$ along the lateral trajectory is determined as in the case of the first variant through the following formula:

$$D_{A0} = K \times D_{M0}$$

in which K is a predetermined coefficient, which can be determined as a function of the exterior conditions and in particular of the maximum speed of the wind.

The main steps of the method in this third variant are represented in the flowchart of FIG. 5b. The initialization of the iterative loop 38 contains steps 31 and 34 already described for the first variant, and a step 51, such as detailed hereinabove, of simplified computation of the initial manoeuvre point $P_{M0}$ and of the anticipated manoeuvre point $P_{A0}$. Steps 35, 36 and 37 of the iterative loop 38 are identical to the first variant.

Thus, the initial manoeuvre point $P_{M0}$ is determined simply on the basis of the arrival point by means of a segment of constant slope of predetermined angle. By simplifying the computation of the initial manoeuvre point $P_{M0}$, and by eliminating the mass computation, the third variant of the method makes it possible to further lighten the computational load and to free up more of the memory of a computer hosting the method for aiding navigation.

FIGS. 6a, 6b, 6c, 6d, 6e, 6f and 6g describe the principle of the method for constructing a vertical trajectory according to a fourth variant of the invention. The general idea of this fourth variant is to determine the initial manoeuvre point $P_{M0}$ by means of the function PRED for backward predictive computation on the basis of the arrival point 21.

Figure 6A:
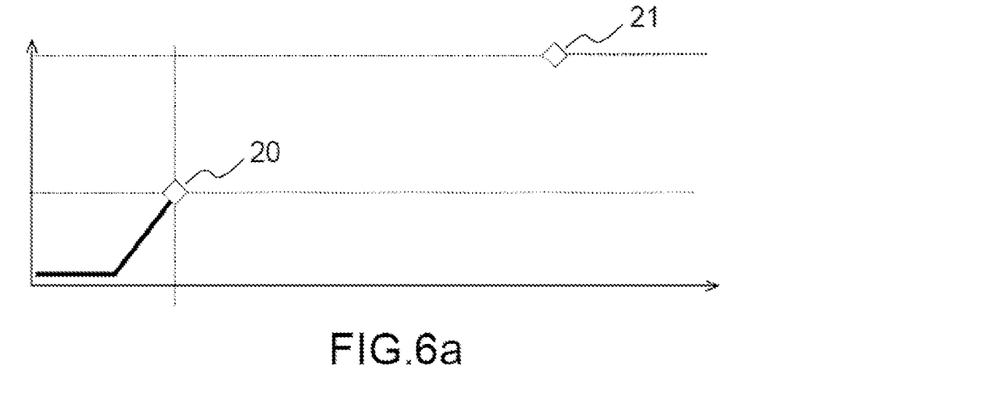
FIGS. 6a, 6b, 6c, 6d, 6e, 6f and 6g describe the principle of the method for constructing a vertical trajectory according to a fourth variant of the invention.
Figure 6B:
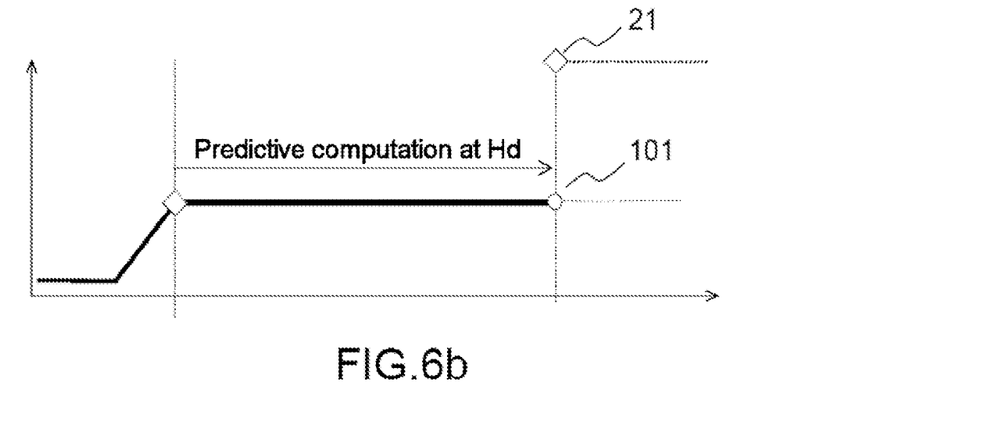
Figure 6C:
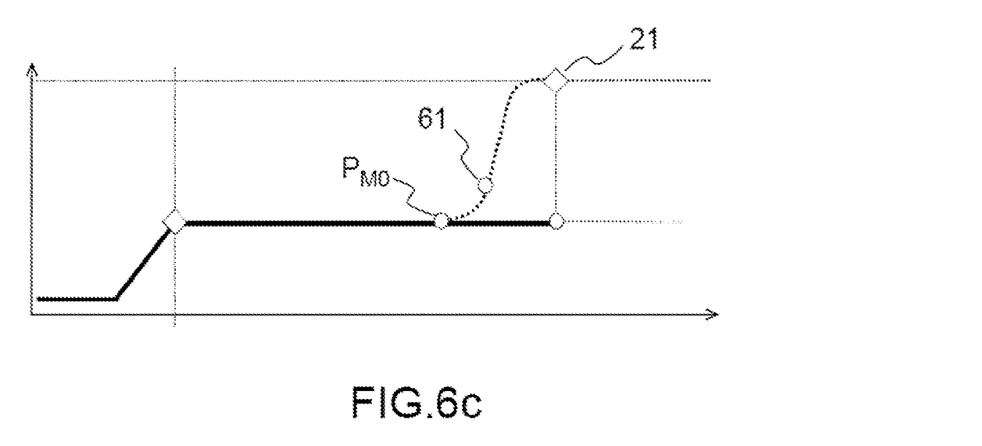

Accordingly, an estimation of the mass at the arrival point 21 is required. On the basis of the departure point 20, the method determines by means of a predictive computation, as represented in FIGS. 6a and 6b, a vertical trajectory joining the departure point 20 to a dummy point 101 whose lateral coordinates are identical to those of the arrival point 21 with a constant altitude equal to $H_d$ as constraint. It would also be possible to use a Breguet formula instead of the predictive computation to obtain the mass, but it is less accurate and would lead to an additional iteration. A mass $M_0$ implemented for the backward predictive computation illustrated in FIG. 6c is thus obtained. Through this backward predictive computation, the method then determines a vertical trajectory for the selected transition manoeuvre, for example consisting of the three segments 11, 12 and 13 of the transition described in FIG. 2. The backward vertical trajectory finishes at the altitude $H_d$ at a point defining the initial manoeuvre point $P_{M0}$. A difficulty of this fourth variant resides in the fact that the lateral coordinates of the point of intersection 61 between the segments 11 and 12, are not known a priori. To solve this difficulty, an iterative loop is set up, the backward predictive computation is repeated until a stable position of the initial manoeuvre point $P_{M0}$ is obtained. Thus, in this variant the initial manoeuvre point $P_{M0}$ is determined on the basis of the arrival point 21 by a predictive trajectory computation, carried out backwards and allowing the aircraft to attain the altitude $H_d$ and the speed $V_d$ through the transition manoeuvre.

Figure 6D:
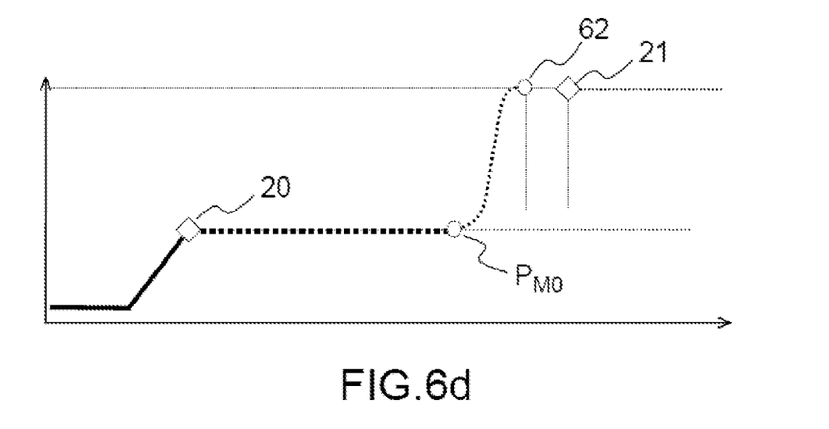
Figure 6E:
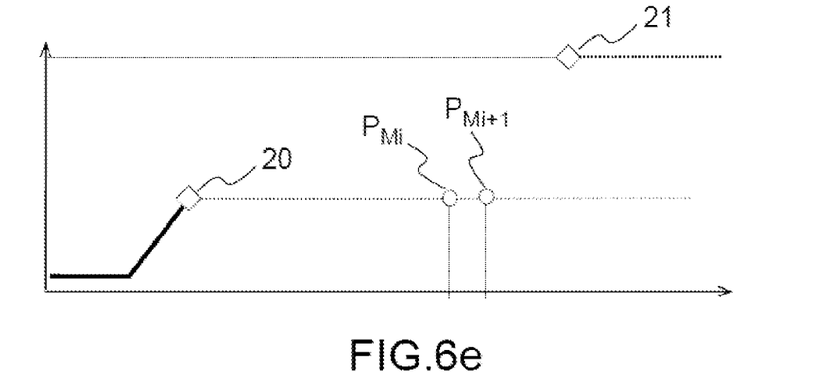
Figure 6F:
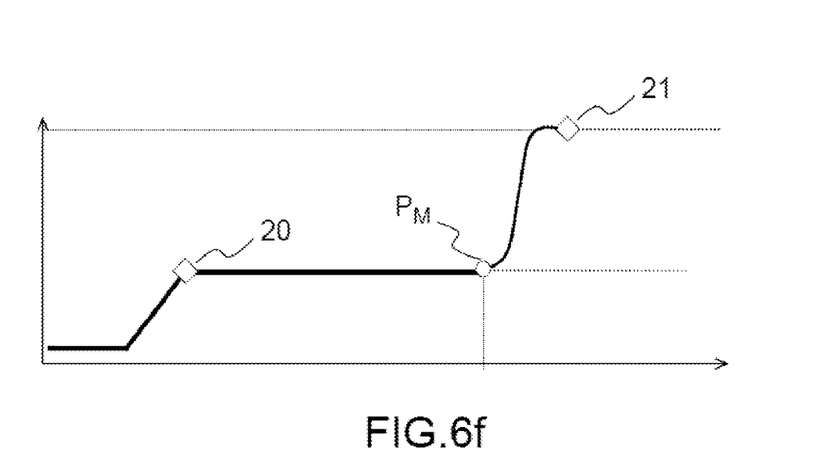

On the basis of the initial manoeuvre point $P_{M0}$ thus computed, a "forward" predictive computation makes it possible to determine a vertical trajectory between the departure point 20 and a point of attainment 62, as illustrated in FIG. 6d. The method is thereafter similar to the previous variants, as illustrated in FIGS. 6e and 6f. The distance $D_i$ separating the point of attainment 62 and the arrival point 21 along the lateral trajectory makes it possible to correct the position of the initial manoeuvre point $P_{Mi}$. The iterative process continues as long as $D_i$ remains greater than a predetermined threshold.

Figure 6G:
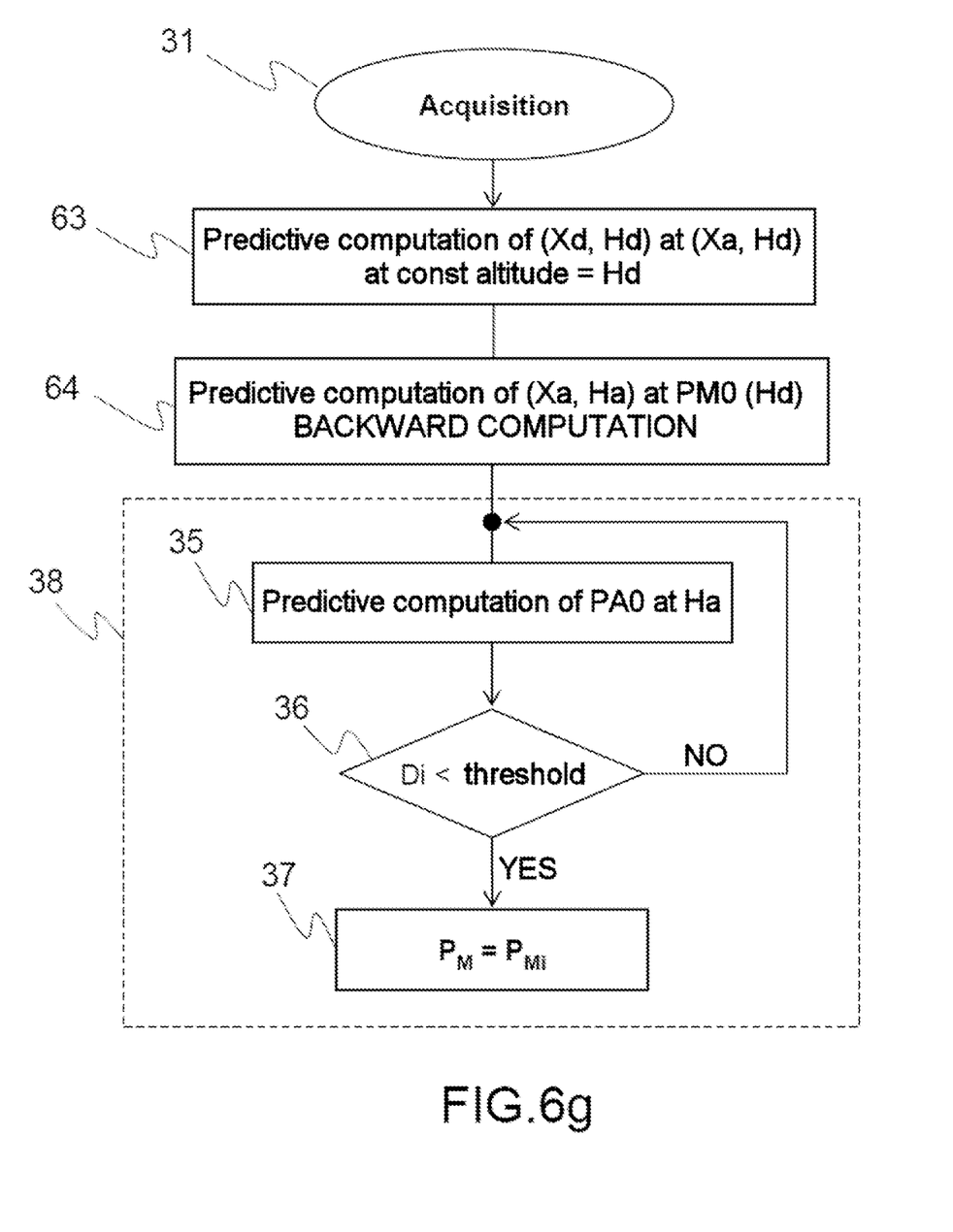

The main steps of the method in this fourth variant are represented in the flowchart of FIG. 6g. The initialization of the iterative loop 38 contains step 31 already described, a step 63 of predictive computation at constant altitude equal to $H_d$ and a step 64 making it possible to determine $P_{M0}$ by means of a backward predictive computation as described hereinabove. Steps 35, 36 and 37 of the iterative loop 38 are identical to the other variants.

Thus, this fourth variant of the method determines the initial manoeuvre point $P_{M0}$ on the basis of the arrival point 21 through a predictive trajectory computation, carried out backwards and allowing the aircraft to attain the altitude $H_d$ and the speed $V_d$ through the transition manoeuvre. This variant of the method is more complex to implement, it requires in particular, in order to determine the initial manoeuvre point $P_{M0}$, the integration of a first iterative loop. On the other hand, it makes it possible to determine $P_{M0}$ with a very good accuracy. Thus, convergence in 1 iteration is ensured. Moreover, if the backward integration has converged right from the first pass (i.e. if (Hd, Xd) has been reached at the point $P_{M0}$ during this backward integration), it is not necessary to launch the predictive computation starting from $P_{M0}$ since the predictions at the various intermediate points are already available.

There exist flight phases for which a time constraint, associated with a waypoint, is imposed. In this case, the speed of the transition, in particular the intermediate speed SPD_INT, can be modified in the course of the transition, if it is desired to be able to comply with this time constraint at the arrival point. This speed variation can modify the rate of climb or of descent of the aircraft and therefore jeopardize the handling of the altitude at the arrival point. For example, a more sizable climb speed may entail a lower climb rate.

To address this constraint, the method envisages an additional margin so as to be able to ensure compliance with the target altitude and an optional time constraint. By way of example, the position of the manoeuvre point $P_M$ is corrected by means of the following formula:

$$D_{Mcorr} = VS_{est}/(VS_{est} - C) \times D_M$$

in which $D_M$ is the distance separating the manoeuvre point $P_M$ from the arrival point 21 along the lateral trajectory, $D_{Mcorr}$ is the corrected distance so as to accommodate the time constraint, C is a constant to be dimensioned as a function of the desired margin, and $VS_{est}$ is determined through the following formula:

$$VS_{est} = (H_a - H_d)/D_M \times GS$$

in which $H_a$ and $H_d$ are the altitude of the arrival point 21 and departure point 20 and GS is the speed of the aircraft at the moment of the computation. Moreover, when $(VS_{est} - C) < 1$, the method applies $(VS_{est} - C) = 1$.

Thus, in a possible mode of implementation, the method advantageously comprises a step of computing a position correction for the manoeuvre point $P_M$, at least as a function of the altitude of the departure and arrival point, of a distance separating the manoeuvre point $P_M$ and the arrival point along the vertical trajectory, and of a speed of the aircraft at the manoeuvre point $P_M$; the said correction being determined so as to make it possible to take into account a constraint regarding time of transit at the arrival point.

The vertical trajectory computation function according to the invention can therefore be implemented according to several possible variants. The choice between these variants arises as a compromise between the accuracy expected in the determination of the manoeuvre point $P_M$ and the time for computing the function, and the associated computational resources.

The variants presented have the following characteristics in common. They pertain to a method for aiding navigation, implemented in a flight management system of FMS type, for the construction of a vertical trajectory of an aircraft following a predetermined lateral trajectory between a departure point and an arrival point; the said departure point and arrival point furthermore being characterized by predefined altitudes, respectively $H_d$ and $H_a$, and predefined speeds, respectively $V_d$ and $V_a$; the said method comprising the steps of:
  selection of a transition manoeuvre in terms of altitude and speed from a predetermined list of manoeuvres,
  determination of a manoeuvre point $P_M$ on the lateral trajectory, of altitude $H_d$ and of speed $V_d$, from which the transition manoeuvre must be initiated so as to allow the aircraft to reach at the arrival point 21 the predefined speed $V_a$ and the predefined altitude $H_a$.

Advantageously, the manoeuvre point $P_M$ is determined by an iterative process comprising an initialization step, consisting in positioning an initial manoeuvre point $P_{M0}$, on the lateral trajectory, between the departure point 20 and the arrival point 21, and an iterative step 38 consisting of:
  a predictive computation of a vertical trajectory between the departure and arrival point, comprising a transition segment, between an intermediate manoeuvre point $P_{Mi}$ and a point of attainment, allowing the aircraft to attain the altitude $H_a$ and the speed $V_a$ through the transition manoeuvre; the intermediate manoeuvre point $P_{Mi}$ being defined in a first iterative loop as the initial manoeuvre point $P_{M0}$,
  a computation of a new intermediate manoeuvre point $P_{Mi+1}$, by shifting the manoeuvre point $P_{Mi}$ on the lateral trajectory by a distance $D_i$ separating the point of attainment from the arrival point along the lateral trajectory; the said iterative process being interrupted when the distance $D_i$ is less than a predetermined threshold; the manoeuvre point $P_M$ being defined as the intermediate manoeuvre point $P_{Mi}$ at the moment of interruption of the iterative process.

The invention also pertains to a flight management system comprising code instructions making it possible to perform the steps of the method for aiding navigation having the characteristics defined above. This new function can be integrated into an FMS system, for real-time trajectory optimization.

It will be possible moreover to envisage the display destined for the crew of one or more quantities determined by means of the method. Consideration is given in particular to the display of the manoeuvre point $P_M$, and to the setting up of a visual and/or audible device making it possible to alert the crew according to a periodicity which increases the closer one approaches the initial manoeuvre point.

The invention claimed is:

1. A method for aiding navigation, implemented in a flight management system, for construction of a vertical trajectory of an aircraft following a predetermined lateral trajectory between a departure point and an arrival point, the departure point and the arrival point being characterized by predefined altitudes, respectively $H_d$ and $H_a$, and predefined speeds, respectively $V_d$ and $V_a$, the method comprising:
  selecting, using the flight management system, a transition manoeuvre in terms of altitude and speed from a predetermined list of manoeuvres;
  determining, using the flight management system and by an iterative process, a manoeuvre point $P_M$ on the predetermined lateral trajectory, between the departure point and the arrival point, of altitude $H_d$ and of speed $V_d$, from which the transition manoeuvre must be initiated so that the aircraft acquires, through the transition manoeuvre, the predefined speed $V_a$ and the predefined altitude $H_a$ only upon reaching the arrival point;
  displaying the manoeuvre point $P_M$ to a crew on a man-machine interface; and
  causing the aircraft to carry out the transition manoeuvre so that the aircraft acquires the predefined speed $V_a$ and the predefined altitude $H_a$ only upon reaching the arrival point,
  wherein the manoeuvre point $P_M$ is determined, using the flight management system, by the iterative process comprising an initialization step, the initialization step comprising positioning an initial manoeuvre point $P_{M0}$, on the lateral trajectory, between the departure point and the arrival point, and an iterative step comprising:
    predictively computing, using the flight management system, a vertical trajectory between the departure point and the arrival point, comprising a transition segment, between an intermediate manoeuvre point $P_{Mi}$ on the lateral trajectory and a point of attainment on the lateral trajectory, allowing the aircraft to attain the predefined altitude $H_a$ and the predefined speed $V_a$ through the transition manoeuvre, the intermediate manoeuvre point $P_{Mi}$ being defined in a first iterative loop as the initial manoeuvre point $P_{M0}$;
    computing, using the flight management system, a new intermediate manoeuvre point $P_{Mi+1}$, by shifting the intermediate manoeuvre point $P_{Mi}$ on the lateral trajectory by a distance $D_i$ separating the point of attainment from the arrival point along the lateral trajectory; and
  interrupting, using the flight management system, the iterative process when the distance $D_i$ is less than a predetermined threshold, the manoeuvre point $P_M$ being defined as the intermediate manoeuvre point $P_{Mi}$ at the interruption of the iterative process.

2. The method according to claim 1, wherein the initial manoeuvre point $P_{M0}$ is determined based on the arrival point on a segment of constant slope of predetermined angle.

3. The method according to claim 1, wherein a transition manoeuvre comprises three successive segments:
  a first segment, during which an altitude and a speed of the aircraft evolve according to two constant gradients, until a target intermediate speed is reached,
  a second segment, during which the speed of the aircraft is maintained constant and the altitude evolves according to a constant gradient, until a target altitude is reached, and a third segment, during which the altitude of the aircraft is maintained constant, and the speed evolves according to a constant gradient, until a target speed is reached.

4. The method according to claim 3, wherein the initial manoeuvre point $P_{M0}$ is determined based on the arrival point by an estimation of lateral length of each of the segments of the transition manoeuvre, by assigning predetermined values to the gradients of speed and of altitude of each of the segments.

5. The method according to claim 4, wherein the initial manoeuvre point $P_{M0}$ is determined for a mass of the aircraft computed by a Breguet formula, at a dummy point defined by an altitude identical to the departure point and lateral coordinates identical to the arrival point.

6. The method according to claim 4, wherein the initial manoeuvre point $P_{M0}$ is determined for a mass of the aircraft computed by a Breguet formula, at a dummy point defined by an altitude identical to the departure point and lateral coordinates computed on a segment of constant slope of predetermined angle joining the dummy point to the arrival point along the lateral trajectory.

7. The method according to claim 1, wherein the initial manoeuvre point $P_{M0}$ is determined based on the arrival point by a predictive trajectory computation, carried out backwards and allowing the aircraft to attain the altitude $H_d$ and the speed $V_d$ through the transition manoeuvre.

8. The method according to claim 1, wherein the initialization step further comprises computing an anticipated initial point $P_{A0}$ on the lateral trajectory, positioned between the departure point and the initial manoeuvre point $P_{M0}$, and a predictive computation of trajectory between the departure point and the anticipated initial point $P_{A0}$, making it possible to limit the predictive trajectory computation of the iterative step to the segment joining the anticipated initial point $P_{A0}$ and the arrival point.

9. The method according to claim 8, wherein the anticipated initial point $P_{A0}$ is determined by the following formula:

$$D_{A0} = K \times D_{M0},$$

in which $D_{A0}$ is a distance separating the anticipated initial point $P_{A0}$ from the initial manoeuvre point $P_{M0}$, $D_{M0}$ is a distance separating the initial manoeuvre point $P_{M0}$ from the arrival point, and K is a predetermined coefficient.

10. The method according to claim 9, wherein the coefficient K is determined by the following formula:

$$K = WIND/TAS_{MIN},$$

in which $WIND_{MAX}$ is an estimation of maximum wind speed between the initial manoeuvre point $P_{M0}$ and the arrival point, and $TAS_{MIN}$ is an estimation of a minimum speed of the aircraft between the initial manoeuvre point $P_{M0}$ and the arrival point.

11. A flight management system configured to:
select a transition manoeuvre, using the flight management system, in terms of altitude and speed from a predetermined list of manoeuvres;
determine, using the flight management system and by an iterative process, a manoeuvre point $P_M$ on a predetermined lateral trajectory, between a departure point and an arrival point, of altitude $H_d$ and of speed $V_d$, from which the transition manoeuvre must be initiated so that an aircraft acquires, through the transition manoeuvre, a predefined speed $V_a$ and a predefined altitude $H_a$ only upon reaching the arrival point;
display the manoeuvre point $P_M$ to a crew on a man-machine interface; and
cause the aircraft to carry out the transition manoeuvre so that the aircraft acquires the predefined speed $V_a$ and the predefined altitude $H_a$ only upon reaching the arrival point,
wherein the manoeuvre point $P_M$ is determined, using the flight management system, by the iterative process comprising an initialization step, the initialization step comprising positioning an initial manoeuvre point $P_{M0}$, on the lateral trajectory, between the departure point and the arrival point, and an iterative step comprising:
predictively computing, using the flight management system, a vertical trajectory between the departure point and the arrival point, comprising a transition segment, between an intermediate manoeuvre point $P_{Mi}$ on the lateral trajectory and a point of attainment on the lateral trajectory, allowing the aircraft to attain the predefined altitude $H_a$ and the predefined speed $V_a$ through the transition manoeuvre, the intermediate manoeuvre point $P_{Mi}$ being defined in a first iterative loop as the initial manoeuvre point $P_{M0}$;
computing, using the flight management system, a new intermediate manoeuvre point $P_{Mi+1}$, by shifting the intermediate manoeuvre point $P_{Mi}$ on the lateral trajectory by a distance $D_i$ separating the point of attainment from the arrival point along the lateral trajectory; and
interrupting, using the flight management system, the iterative process when the distance Di is less than a predetermined threshold, the manoeuvre point $P_M$ being defined as the intermediate manoeuvre point $P_{Mi}$ at the interruption of the iterative process.

* * * * *